(12) United States Patent
Ye et al.

(10) Patent No.: US 9,686,780 B2
(45) Date of Patent: Jun. 20, 2017

(54) DELIVERY OF DOWNLINK CONTROL INFORMATION ASSOCIATED WITH DOWNLINK DATA TRANSMISSION ON A LICENSED-ASSISTED ACCESS CARRIER

(71) Applicant: Alcatel Lucent USA, Inc., Murray Hill, NJ (US)

(72) Inventors: Sigen Ye, New Providence, NJ (US); Fang-Chen Cheng, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 137 days.

(21) Appl. No.: 14/690,447

(22) Filed: Apr. 19, 2015

(65) Prior Publication Data

US 2016/0309451 A1    Oct. 20, 2016

(51) Int. Cl.
    *H04W 72/12*  (2009.01)
    *H04W 72/04*  (2009.01)
    *H04L 5/00*  (2006.01)
    *H04W 74/08*  (2009.01)

(52) U.S. Cl.
    CPC ...... *H04W 72/042* (2013.01); *H04W 74/0808* (2013.01)

(58) Field of Classification Search
    CPC . H04W 16/14; H04W 74/0808; H04W 84/12; H04W 72/0446
    USPC ................... 370/329, 336, 330; 455/454, 436
    See application file for complete search history.

(56) References Cited

U.S. PATENT DOCUMENTS

| 2013/0242882 | A1* | 9/2013 | Blankenship | ....... H04W 72/042 370/329 |
| 2016/0174259 | A1* | 6/2016 | Mukherjee | ............ H04L 1/1816 370/280 |
| 2016/0255648 | A1* | 9/2016 | Frenne | .................. H04L 5/0048 |

* cited by examiner

*Primary Examiner* — Charles C Jiang
*Assistant Examiner* — Will Lin
(74) *Attorney, Agent, or Firm* — Harness, Dickey & Pierce, P.L.C.

(57) ABSTRACT

A method of delivering downlink control information associated with downlink data transmission on an unlicensed channel includes, transmitting downlink control information to a user equipment (UE) on a second channel without knowing when the unlicensed channel is available for transmission, wherein the downlink control information corresponds to a later transmission of data on the unlicensed channel if the unlicensed channel is available; and transmitting the data to the UE on the unlicensed channel according to the downlink control information, if the unlicensed channel is available for transmission.

26 Claims, 6 Drawing Sheets

DELIVERY OF DOWNLINK CONTROL INFORMATION ASSOCIATED WITH DOWNLINK DATA TRANSMISSION ON A LICENSED-ASSISTED ACCESS CARRIER

BACKGROUND

1. Field

Example embodiments relate generally to a method of delivering downlink control information, a network element and/or a system configured to perform the same.

2. Related Art

In a $3^{rd}$ Generation Partnership Project (3GPP) Long-Term Evolution (LTE) wireless network, a control channel carries downlink control information (DCI) messages from an eNodeB to multiple user equipments (UEs). For example, a Physical Downlink Control Channel (PDCCH) and/or an Enhanced PDCCH may carry DCI messages from the eNodeB to one or more UEs. The DCI messages may contain information enabling a UE to receive, demodulate and decode data transmitted on a physical downlink shared channel (PDSCH).

The control channel (e.g. PDCCH or EPDCCH) and/or the data channel (PDSCH) may be transmitted using RF communications at various frequency bands. The RF communication may be regulated by a government entity such that the government entity controls which parties may use which frequency bands for communication. For example, in the US, the government has defined certain portions of the radio spectrum as being part of a licensed band while defining other portions of the radio spectrum as being part of an unlicensed band.

Licensed bands are bands including radio frequencies which require an entity to obtain a license from the government before using the radio frequencies for communication. To the contrary, an entity may not require a special license to use radio frequencies within an unlicensed band for communications. In general, example uses of the licensed portions of the radio spectrum include use by wireless communications companies to provide wireless coverage for mobile devices over the licensed portions of the radio spectrum, while example uses of the unlicensed portions of the radio spectrum include use by 802.11 (e.g., Wi-Fi) capable devices, for example over the 5 GHz unlicensed band.

SUMMARY

Some example embodiments relate to a method of delivering downlink control information associated with downlink data transmission on an unlicensed channel.

In some example embodiments, the method includes transmitting, by an ENodeB, downlink control information on a second channel without knowing when the unlicensed channel is available for transmission, wherein the downlink control information corresponds to a later transmission of data on the unlicensed channel if the unlicensed channel is available; and transmitting the data on the unlicensed channel according to the downlink control information, if the unlicensed channel is available for transmission.

In some example embodiments, the transmitting the data transmits the data to a user equipment (UE) over a partial sub-frame.

In some example embodiments, the method includes transmitting the downlink control information associated with a subsequent sub-frame after the partial sub-frame via a downlink control channel on the unlicensed channel.

In some example embodiments, the second channel is a licensed channel.

In some example embodiments, the method includes performing a channel assessment to determine if the unlicensed channel is available for transmission.

In some example embodiments, the transmitting downlink control information transmits the downlink control information on the second channel prior to the channel assessment successfully determining that the unlicensed channel is available for transmission.

In some example embodiments, the transmitting the data transmits the data on the unlicensed channel based on a result of performing the channel assessment.

In some example embodiments, the method includes transmitting a signal that enables the UE to detect a start of the data transmission.

In some example embodiments, the downlink control information is valid for a time duration, and the transmitting the data transmits the data in sub-frames on the unlicensed channel occurring within the time duration according to the downlink control information.

In some example embodiments, the transmitting downlink control information transmits the downlink control information via a physical downlink control channel (PDCCH) or an enhanced PDCCH (EPDCCH) on the second channel.

Some example embodiments relate to a network element.

In some example embodiments, the network element includes a transmitter configured to transmit information via an unlicensed channel and a second channel; and a processor connected to the transmitter and configured to, transmit, via the transmitter, downlink control information on the second channel without knowing when the unlicensed channel is available for transmission, wherein the downlink control information corresponds to a later transmission of data on the unlicensed channel if the unlicensed channel is available, and transmit, via the transmitter, the data on the unlicensed channel according to the downlink control information, if the unlicensed channel is available for transmission.

In some example embodiments, the processor is configured to transmit the data to a UE over a partial sub-frame.

In some example embodiments, the processor is configured to transmit the downlink control information associated with a subsequent sub-frame after the partial sub-frame via a downlink control channel on the unlicensed channel.

In some example embodiments, the second channel is a licensed channel.

In some example embodiments, the processor further configured to perform a channel assessment to determine if the unlicensed channel is available for transmission of the data.

In some example embodiments, the processor is configured to transmit the downlink control information on the second channel prior to determining, via the channel assessment, that the unlicensed channel is available for transmission of the data.

In some example embodiments, the processor is configured to transmit the data on the unlicensed channel based on a result of performing the channel assessment.

Some example embodiments relate to a user equipment (UE).

In some example embodiments, the UE includes a receiver configured to, receive data transmission over a partial sub-frame from a network element via an unlicensed channel, and receive downlink control information via a second channel from the network element prior to the data transmission on the unlicensed channel; and a processor configured to decode the data transmission received over the partial sub-frame based on the downlink control information.

In some example embodiments, the receiver is configured to monitor the unlicensed channel continuously, regardless of whether the downlink control information is received on the second channel.

In some example embodiments, the receiver is configured to start to monitor the unlicensed channel only after the downlink control information is received on the second channel.

In some example embodiments, the UE is configured to receive the downlink control information via a physical downlink control channel (PDCCH) or enhanced PDCCH (EPDCCH) on the second channel.

In some example embodiments, the UE is configured to, generate decoded information by decoding the downlink control information, and store the decoded control information in a memory.

In some example embodiments, the UE is configured to apply the decoded control information only to the data transmission received within a defined time duration after receiving the downlink control information.

In some example embodiments, the UE is configured to detect a start of the data transmission based on a signal transmitted by the network element.

In some example embodiments, the UE is configured to detect the start of the data transmission based on one or more of a signal received before data transmission and a signal embedded in the data transmission in the partial sub-frame.

In some example embodiments, the UE is configured to determine a transport block size based on at least the downlink control information and a length of the data transmission.

In some example embodiments, the UE is configured to determine the transport block size by applying a scaling factor to information in transport block size tables, the scaling factor being dependent on the length of the data transmission.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: existing radio access network (RAN) elements, such as eNodeBs; and/or existing Evolved Packet Core (EPC) network elements, such as mobile management entities (MMES), packet data network (PDN) gateways (PGWs), serving gateways (SGWs), servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNodeBs may have all the functionality associated with conventional, well-known base stations in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to eNB (or network), whereas downlink (or forward link) transmissions refer to transmissions from eNB (or network) to UE.

According to example embodiments, the PGWs, SGWs, MMEs, UEs, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, a MME, PGW and/or SGW may be any well-known gateway or other physical computer hardware system. The MME, PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, PGW, SGW, eNBs, etc.); and to transmit/receive (wireline or wirelessly) controls signals via a control plane or interface to/from other network elements.

The MME, PGW and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or controls signals via respective data and control planes or interfaces to/from one or more switches, gateways, MMEs, controllers, other eNBs, UEs, etc.

As discussed herein, the PGW, SGW, and MME may be collectively referred to as Evolved Packet Core network elements or entities (or core network elements or entities). The eNB may be referred to as a radio access network (RAN) element or entity.

Figure 1:
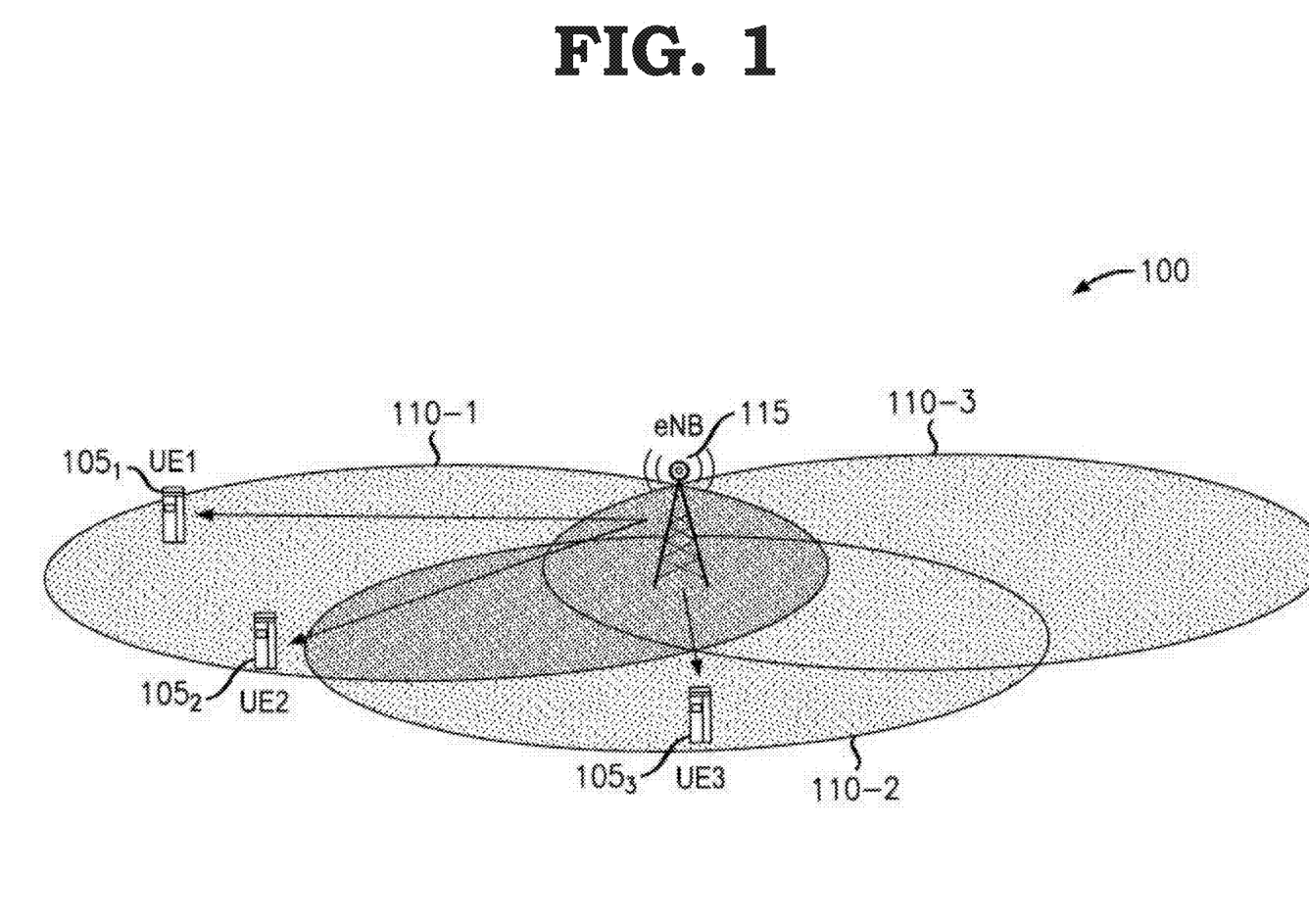
FIG. 1 illustrates a wireless communication network according to some example embodiments.

FIG. 1 illustrates a wireless communication network according to an example embodiment.

Referring to FIG. 1, a wireless communication network 100 may include at least one eNodeB 115 configured to communicate with an access gateway (not shown) and one or more user equipments (UEs) $105_1$ to $105_N$. The network may be a Long Term Evolution (LTE) network.

The access gateway (not shown) may be communicatively coupled to a core network (CN) that is, in turn, communicatively coupled to one or more external networks, such as the Internet and/or other circuit and/or packet data networks.

The eNodeB 115 is configured to provide an Evolved Universal Terrestrial Radio Access (E-UTRA) user plane (PDCP/RLC/MAC/PHY) and radio resource control (RRC) plane protocol terminations with the user equipments (UEs) 105 located within cells $110_1$ to $110_N$.

In some example embodiments, the eNodeB 115 may be configured to utilize Licensed Assisted Access (LAA) such that the eNodeB 115 communicates with the UEs 105 using both licensed bands for LTE and unlicensed bands. The eNodeB 115 may communicate over the licensed portions of the radio spectrum using a band in which an entity (e.g., service provider or communications network operator) associated with the eNodeB 115 has obtained a license to use the band from a national, regional and/or government organization. Further, the eNodeB 115 may communicate over the unlicensed portions of the radio spectrum without the entity associated therewith obtaining a license from the national, regional and/or government organization.

For example, the eNodeB 115 may be configured to communicate over licensed and unlicensed portions of the radio spectrum, frequencies, or bands as defined by a national, regional and/or government organization including, for example, the US Federal Communications Commission (FCC), which defines the known 5 GHz unlicensed band as an unlicensed portion of the radio spectrum.

In addition to transmission by the eNodeB 115, other technologies may also utilize the unlicensed bands. For example, Wi-Fi and Bluetooth devices may communicate over the unlicensed bands.

Since the unlicensed band can be used by other technologies or License Assisted Access (LAA) by another operator, coexistence between different networks (of same or different technologies) may be required.

To provide fair coexistence, the eNodeB 115 may be configured to utilize a listen-before-talk (LBT) mechanism to sense if the channel is free of transmission from other devices before the eNodeB 115 transmits over the channel. If the channel is occupied, the eNodeB 115 may continue to sense the channel and transmit only when certain conditions are satisfied.

In some example embodiments, the eNodeB 115 may utilize a Load Based Equipment (LBE) scheme to listen-before-talking (LBT). For example, prior to a transmission, the eNodeB 115 may perform a Clear Channel Assessment (CCA) by observing the channel for a CCA observation period (at least 20 µs) to determine if it is occupied (i.e. energy detection). If the channel is busy, the eNodeB 115 may perform an Extended CCA (ECCA) where the eNodeB 115 generates a random number N, continues to observe the channel, and may transmit only after it observes the channel being free for N CCA observation periods, where the N free CCA observation periods may not necessarily be continuous.

However, in LTE, transmission may only begin at certain defined time instances, such as a sub-frame boundary or a small offset (e.g. up to 4 OFDM symbols) from the sub-frame boundary. Therefore, conventionally, if a time that the eNodeB 115 determines that the channel is free does not coincide with the defined time instances for starting a transmission, the eNodeB 115 may need to wait for the next defined time instance before beginning transmission over the channel. In the interim, to avoid other devices sensing the channel as being free, and, therefore, starting their own interfering transmission, the eNodeB 115 may need to reserve the channel. For example, the eNodeB 115 may broadcast a signal for the duration of the waiting period to reserve the channel. However, this signal, when not used only for data transmission, may increase system overhead and reduce efficiency.

In contrast, as discussed below, in one or more example embodiments, rather than wait till the next full sub-frame, the eNodeB 115 may transmit data to the UEs 105 in the initial partial sub-frame.

Figure 2A:
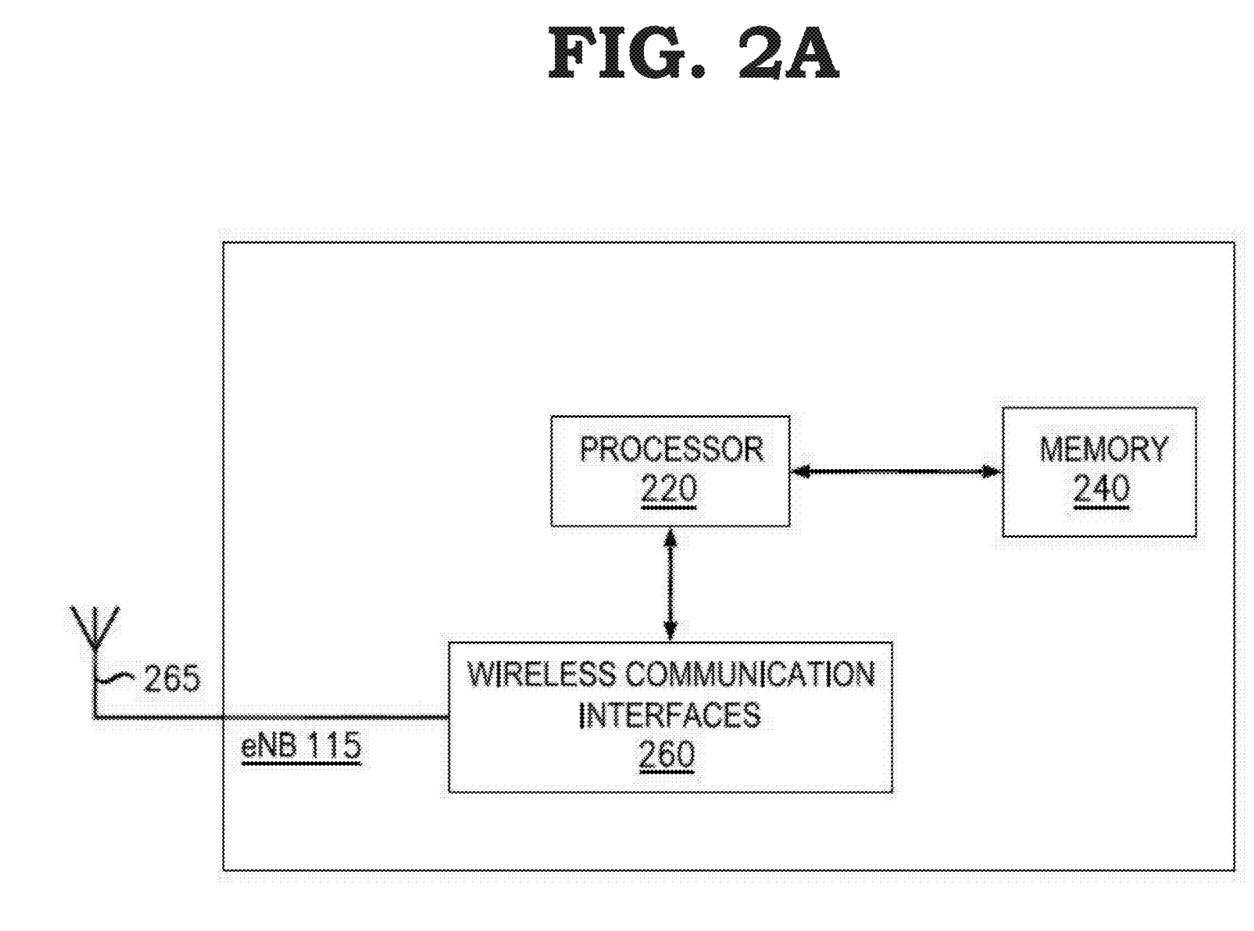
FIG. 2A illustrates a eNodeB according to some example embodiments.

FIG. 2A illustrates an eNodeB according to some example embodiments.

Referring to FIG. 2A, the LTE macro eNodeB 115 may include a memory 240, a processor 220 connected to the memory 240, various interfaces 260 connected to the processor 220, and an antenna 265 connected to the various interfaces 260. The various interfaces 260 and the antenna 265 may constitute a transceiver for transmitting/receiving data from/to eNodeB 115. As will be appreciated, depending on the implementation of the eNodeB 115, the eNodeB 115 may include many more components than those shown in FIG. 2A. However, it is not necessary that all of these generally conventional components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores an operating system and any other routines/modules/applications for providing the functionalities of the eNodeB 115 (e.g., functionalities of a base station, methods according to the example embodiments, etc.) to be executed by the processor 220. These software components may also be loaded from a separate computer readable storage medium into the memory 240 using a drive mechanism (not shown). Such separate computer readable storage medium may include a disc, tape, DVD/CD-ROM drive, memory card, or other like computer readable storage medium (not shown). In some example embodiments, software components may be loaded into the memory 240 via one of the various interfaces 260, rather than via a computer readable storage medium.

The processor 220 may be configured to carry out instructions of a computer program by performing the arithmetical, logical, and input/output operations of the system. Instructions may be provided to the processor 220 by the memory 240.

The various interfaces 260 may include components that interface the processor 220 with the antenna 265, or other input/output components. As will be understood, the interfaces 260 and programs stored in the memory 240 to set forth the special purpose functionalities of the eNodeB 115 will vary depending on the implementation of the eNodeB 115.

Although only the eNodeB 115 is illustrated in more detail in FIG. 2A, it should be understood that each of the small cells, and the WiFi (or WLAN) routers and/or APs shown in FIG. 1 may be structured similarly and include similar components.

Figure 2B:
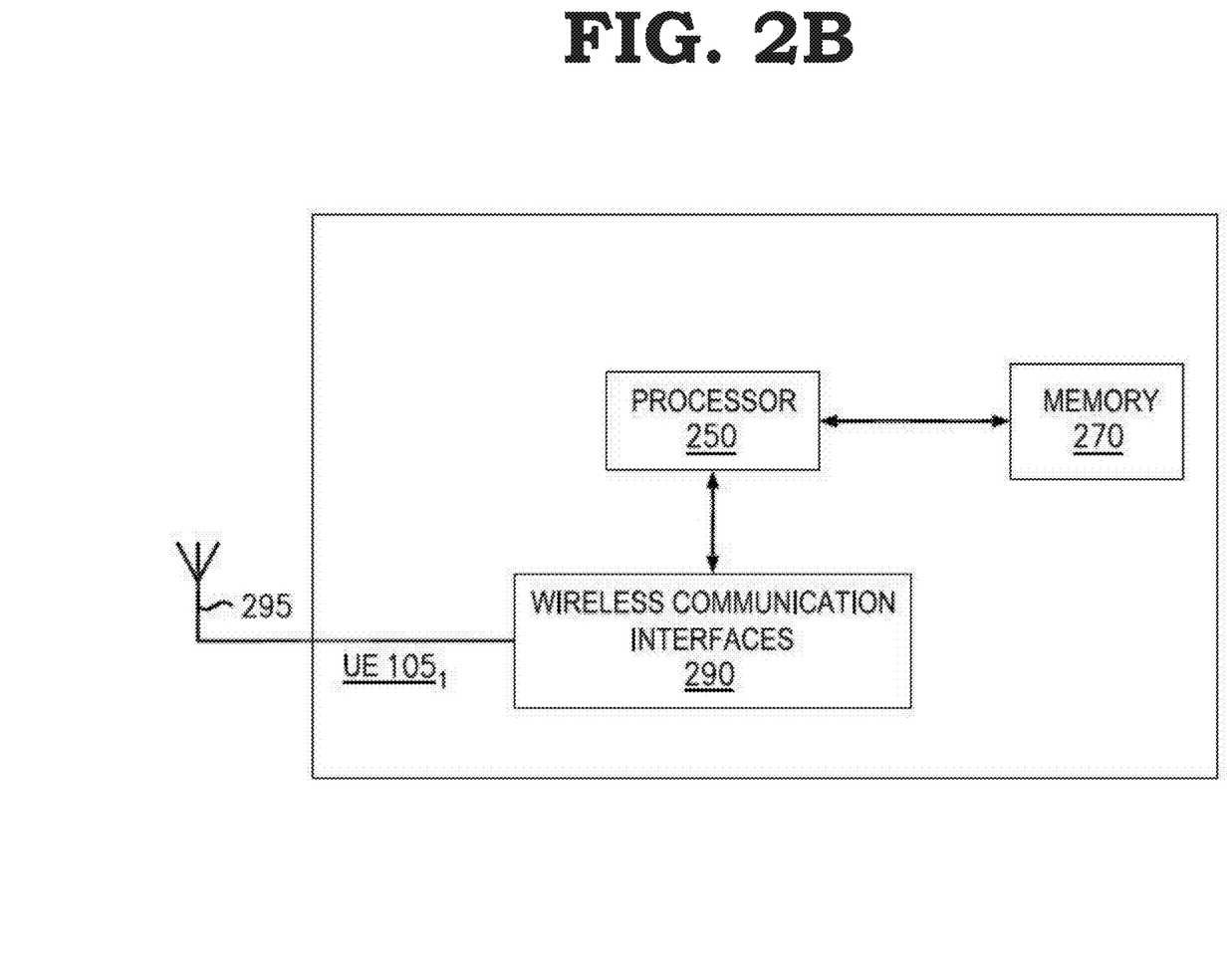
FIG. 2B illustrates a UE according to some example embodiments.

FIG. 2b illustrates a user equipment (UE) according to some example embodiments.

Referring to FIG. 2B, each of the UEs 105 may include a processor 250 connected to a memory 270, various interfaces 290, and an antenna 295.

As will be appreciated, depending on the implementation of the UE 105, the UE 105 may include many more components than those shown in FIG. 2B. However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores an operating system and any other routines/modules/applications for providing the functionalities of the UE 105 (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE 105 will vary depending on the implementation of the UE 105.

Figure 3:
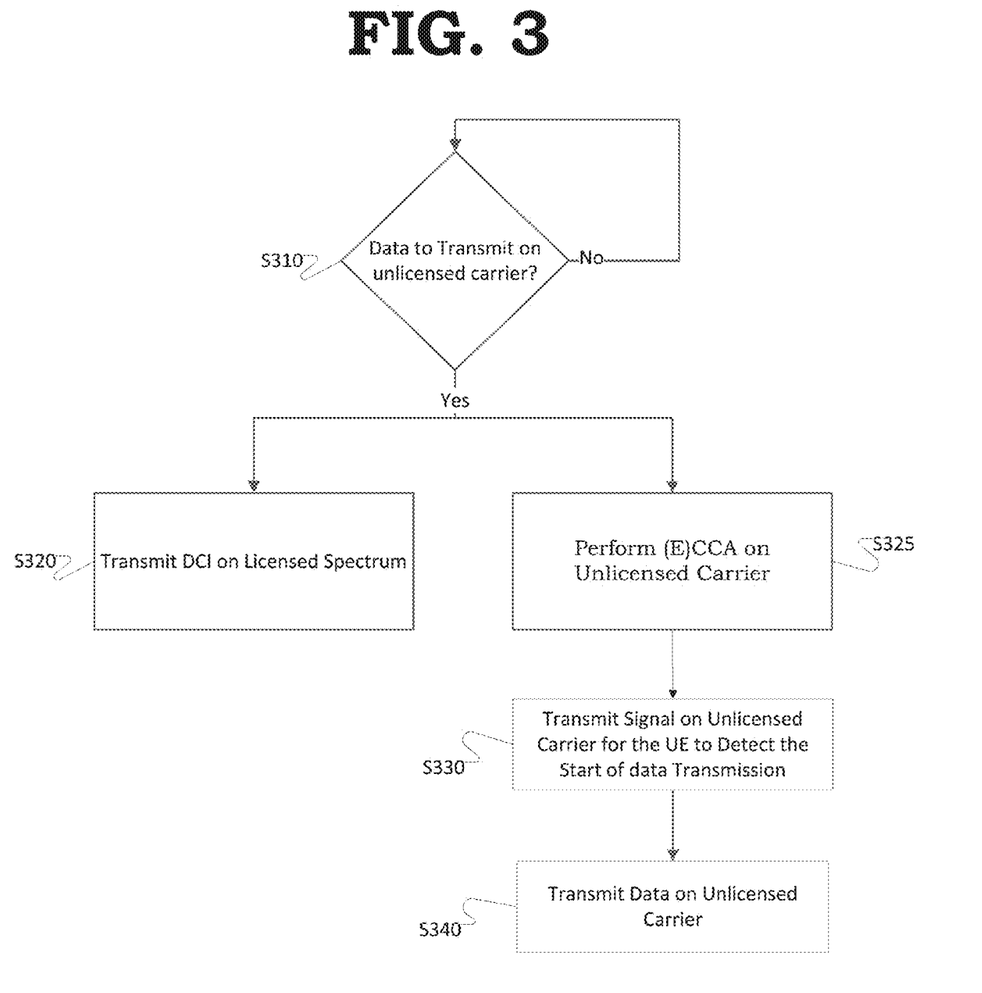
FIG. 3 illustrates a flow chart of a method of delivering a downlink control message according to some example embodiments.

FIG. 3 illustrates a flow chart of a method of delivering a downlink control message according to some example embodiments.

Referring to FIGS. 1-3, in operation S310, the eNodeB 115 may determine whether there is data to transmit to one of the UEs $105_N$ on the downlink. For example, the eNodeB 115 may determine whether data for one of the UEs $105_N$ is received from, for example an external network, such as the Internet and/or other circuit and/or packet data networks via the access network and determine further whether to transmit part or all of the data on the unlicensed carrier.

In operation S320, the eNodeB 115 may transmit downlink control information (DCI) to one of the UEs $105_N$ using cross-carrier scheduling such that the DCI is transmitted on a second carrier (e.g. a licensed carrier) without knowing whether and/or when the channel in the unlicensed spectrum is available for data transmission in the future. Therefore, the eNodeB 115 may transmit the DCI on the second carrier without first knowing whether the eNodeB 115 can transmit on the unlicensed carrier.

The DCI may contain information the UE 105 needs to decode a data packet contained a data transmission once the UE 105 detects the starting position of the data transmission.

In some example embodiments, the DCI may include scheduling assignments, information about the type of modulation used to modulate the data, and the location and the number of resource blocks carrying the data. The eNodeB 115 may utilize an existing DCI format, a modified DCI format, or a new DCI format.

Since the channel on unlicensed band might not be available for transmission for a while, in some example embodiments the DCI is configured to be valid for a time duration, such that the UE 105 utilizes the information contained in the DCI only if the UE detects a partial sub-frame data transmission within the time duration. In some example embodiments the eNodeB 115 and the UE 105 may predetermine the time duration. In other example embodiments, the UE 105 may determine the time duration semi-statically using higher layer signaling transmitted by the eNodeB 115. In still other example embodiments, the UE 105 may determine the time duration dynamically via the DCI itself transmitted by the eNodeB 115. The time duration can be one or more sub-frames (or, alternatively infinite). The DCI may stay valid for resource allocation in all sub-frames in the entire time duration. Alternatively, the DCI may expire after the UE 105 uses the DCI to decode the first partial sub-frame transmission. In some other embodiments, the eNodeB 115 may send another DCI to supersede the previous DCI even if the previous DCI is still within its valid time duration.

In some example embodiments, since the initial transmitted data is a partial sub-frame, the eNodeB 115 may provide information (e.g. frequency resources, modulation and coding scheme MCS) in the DCI that allows the UE 105 to determine the transport block size once the UE 105 detects the start of the data transmission.

In operation S325, the eNodeB 115 may perform Clear Channel Assessment (CCA) on unlicensed carrier by observing the channel for a CCA observation period (e.g. at least 20 μs) to determine if it is occupied (i.e. energy detection). If the channel is occupied, the eNodeB 115 may perform an Extended CCA (ECCA) by generating a random number N, observing the channel until it observes the channel being free for N CCA observation periods. The eNodeB 115 may transmit the DCI from the licensed carrier in operation S320 before completing the ECCA procedure in operation S325. While the eNodeB 115 is described as using CCA and/or ECCA, in other example embodiments, the eNodeB may use any other listen-before-talk mechanism.

Therefore, as shown in FIG. 3, in operation S320, the eNodeB 115 may transmit the DCI to one of the UEs $105_N$ on the second carrier without waiting for the (E)CCA to succeed in determining, in operation s325, that the unlicensed carrier is free. Thus, the eNodeB 115 may perform operation S320 independently of operation S325, and the UE 105 may receive the DCI in an earlier sub-frame as compared to the partial sub-frame associated with the data transmission.

In operation S330, the eNodeB 115 may transmit signal so that the UE 105 can detect the start of the data transmission, without relying on explicit signaling from the eNodeB 115.

For example, in some example embodiments, the eNodeB 115 may transmit a separate desired (or, alternatively, pre-defined) signal on the unlicensed carrier before the data transmission such that the UE 105 may detect this separate signal and infer the starting position of the data transmission. In some other example embodiments, the eNodeB 115 may embed the desired (or, alternatively, the pre-defined) signal in the data transmission itself, for example as a reference signal, so that the UE 105 may detect the embedded signal.

In operation S340, the eNodeB 115 may transmit the data over physical downlink shared channel (PDSCH) on the unlicensed carrier.

Thereafter, the eNodeB 115 may transmit a next full sub-frame. The data transmitted in the next sub-frame(s) may be independently encoded from the partial sub-frame or jointly encoded with the partial sub-frame.

When the eNodeB 115 transmits the data in a subsequent sub-frame that is independent from the partial sub-frame, the subsequent sub-frame may have its own DCI associated therewith. In some example embodiments the eNodeB 115 may transmit this subsequent DCI using example embodiments, such that the DCI is transmitted on the licensed spectrum independently of the determination that the unlicensed channel is free. Alternatively, the eNodeB 115 may utilize a conventional method to transmit the subsequent DCI on the physical downlink control channel (PDCCH) in the subsequent sub-frames on the unlicensed channel. For example, the eNodeB 115 may use self-scheduling to transmit the DCI on the PDCCH or enhanced physical downlink control channel (EPDCCH) in the subsequent sub-frames on the unlicensed channel. In other example embodiments, the eNodeB 115 may utilize cross-carrier scheduling and transmit the subsequent DCI on PDCCH or EPDCCH in the subsequent sub-frames on the licensed spectrum.

Figure 4:
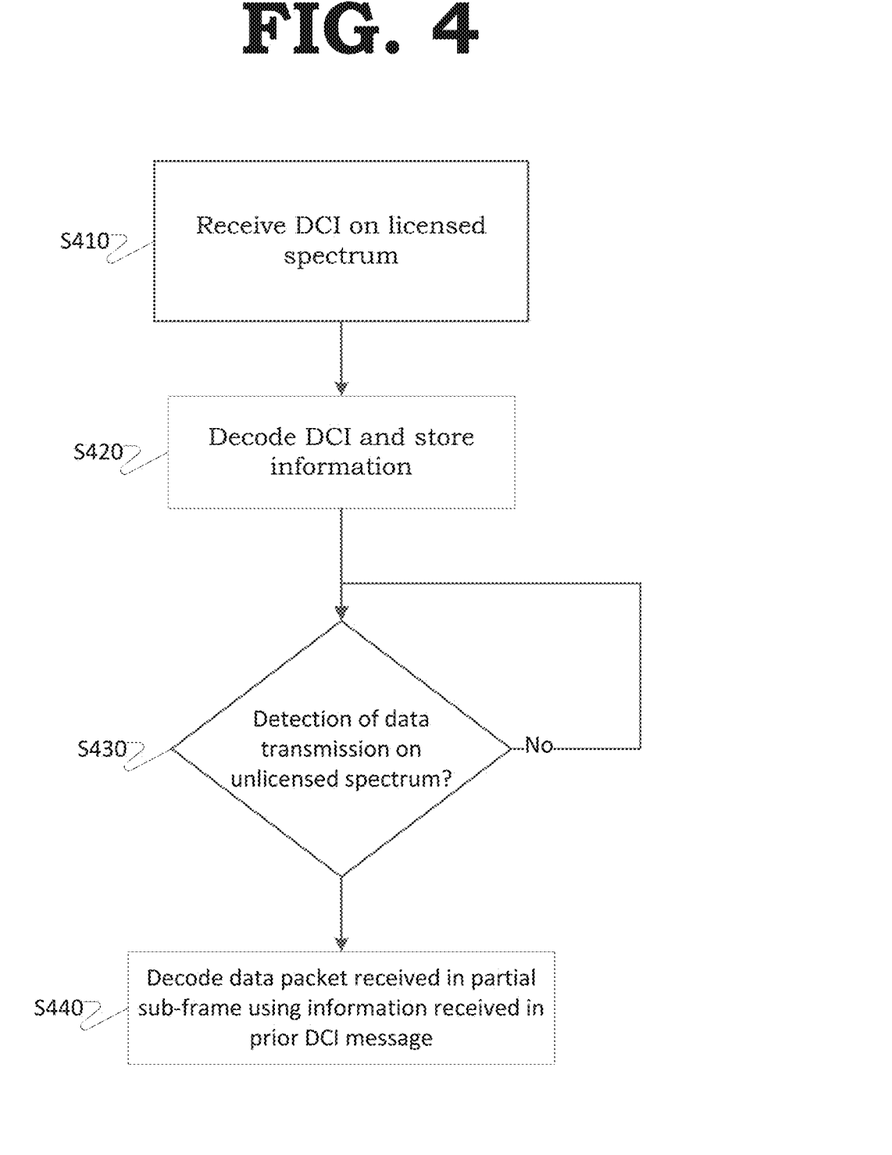
FIG. 4 illustrates a flow chart of a method of decoding data according to some example embodiments.

FIG. 4 illustrates a flow chart of a method of decoding data according to some example embodiments.

Referring to FIG. 4, in operation S410, the UE 105 may receive a downlink control information (DCI) from the eNodeB 115 via the licensed carrier spectrum irrespective of the status of the unlicensed carrier.

In operation S420, the UE 105 may decode and store information contained in the DCI. The information may include information needed to decode a data packet contained a subsequent data transmission once the UE 105 detects the starting position of the data transmission. For example, the information may include scheduling assignments, information about the type of modulation used to modulate the data, and the resource blocks carrying the data.

In some example embodiments the DCI may be valid for a time duration, such that the UE 105 utilizes the information contained in the DCI only if the UE detects a partial sub-frame data transmission over the unlicensed carrier within the time duration. In some example embodiments the eNodeB 115 and the UE 105 may predetermine the time duration. In other example embodiments, the UE 105 may determine the time duration semi-statically using higher layer signaling received from the eNodeB 115. In still other example embodiments, the UE 105 may determine the time duration dynamically via the DCI itself received from the eNodeB 115. The time duration can be one or more sub-frames (or, alternatively, infinite). The DCI may stay valid for the entire time duration. Alternatively, the DCI may expire after the UE 105 uses the DCI to decode the first partial sub-frame transmission. In some other embodiments, the eNodeB 115 may send another DCI to supersede the previous DCI even if the previous DCI is still within its valid time duration.

In some example embodiments, the UE 105 continuously monitors the unlicensed carrier for the start of the data transmission. In some other example embodiments, the UE 105 starts to monitor the unlicensed carrier only after it decodes the DCI message on the licensed carrier which indicates the potential data transmission on the unlicensed carrier. This typically requires sufficient time between the transmission of the downlink control message and the transmission of the data to allow the UE 105 to decode the downlink control message before starting to monitor the LAA carrier. This avoids unnecessary monitoring and unnecessary buffering at the UE 105, which saves both power and complexity. When the UE 105 stops monitoring the unlicensed carrier may be based on, for example, the valid time duration of the DCI and/or the data transmission burst length once the UE 105 detects a data transmission and/or some desired (or, alternatively, pre-defined) rules.

In some example embodiments, since the subsequently transmitted data is a partial sub-frame, the UE 105 may determine the transport block size using information (e.g. frequency resources, modulation and coding scheme) provided in the DCI and/or the length of the data transmission based on UE's 105 detection of the start of the data transmission. For example, the UE 105 may apply a scaling factor to a transport block size (TBS) table stored at the UE 105 utilized for standard LTE communication, where the scaling factor depends on the length of the data transmission (e.g., the number of symbols transmitted within a sub-frame). Therefore, the UE 105 may not need to store TBS tables for each starting position of the data transmission.

In operation S430, the UE 105 may blindly detect the start of the data transmission based on some signal(s) that the eNodeB 115 transmits before or together with the data transmission.

For example, in some example embodiments, the UE 105 may receive a separate desired (or, alternatively, pre-defined) signal on the unlicensed carrier before the data transmission such that the UE 105 may detect this separate signal and infer the starting position of the data transmission. In some other example embodiments, the UE 105 may receive a signal embed with the desired (or, alternatively, the pre-defined) signal in the data transmission itself, for example as a reference signal, so that the UE 105 may detect the embedded signal.

In operation S440, the UE 105 may decode a data packet received in a partial sub-frame over physical downlink shared channel (PDSCH) on the unlicensed carrier using the previously received DCI message.

In one or more example embodiments, the eNodeB 115 may transmit the data over the unlicensed carrier immediately after determining that the unlicensed channel is clear without waiting for the next full sub-frame by transmitting the corresponding control information over the licensed carrier prior to determining that the channel is clear. Therefore, the eNodeB 115 may not need to transmit a signal to reserve the unlicensed carrier until the next full sub-frame, and, thus, system overhead and resource consumption may be further reduced. Moreover, in one or more example embodiments, the UE 105 does not need to continuously monitor the unlicensed carrier and/or buffer the data received in the partial sub-frame until the DCI message is received in the next full sub-frame, and, thus, the UE 105 complexity and power consumption may be further reduced.

Figure 5:
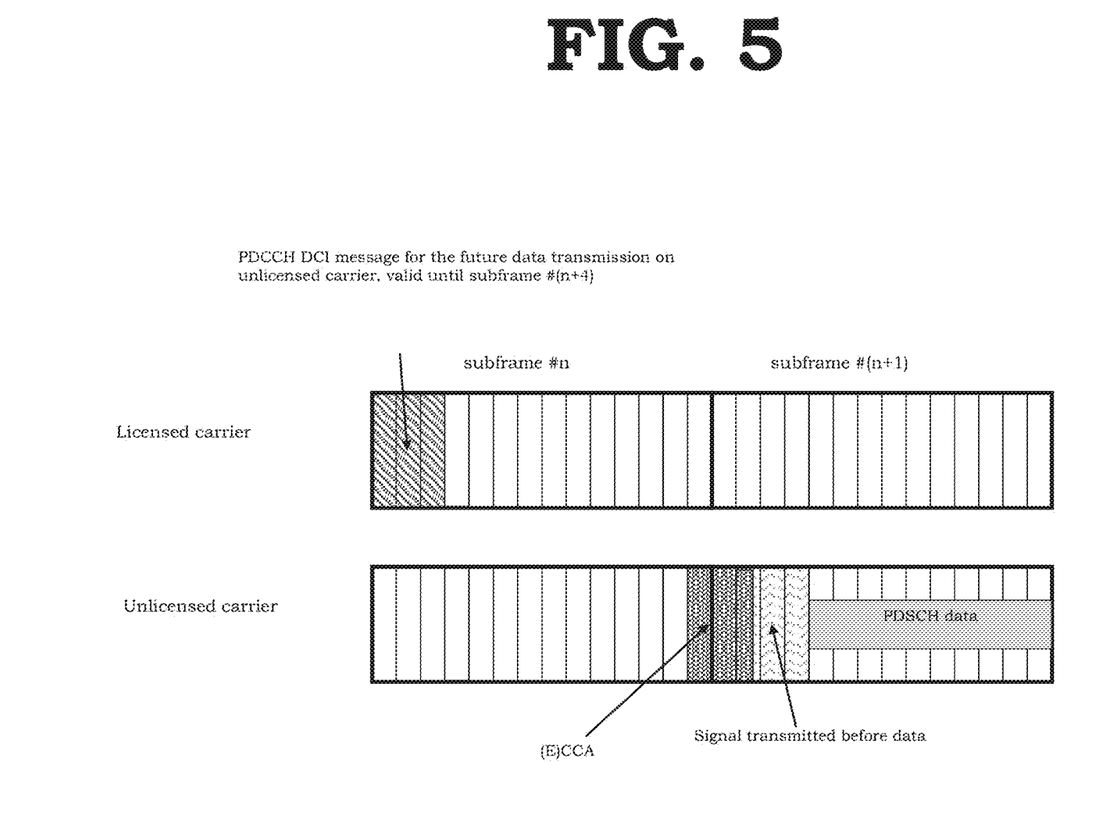
FIG. 5 illustrates a timing diagram of delivering a download control message according to some example embodiments.

FIG. 5 illustrates a timing diagram of delivering a download control message according to some example embodiments.

Referring to FIG. 5, when the eNodeB 115 intends to transmit to a UE 105 on an unlicensed carrier, a DCI message is transmitted on the PDCCH of a licensed carrier in sub-frame n, to indicate to the UE that there may be a PDSCH transmission on the unlicensed carrier. For example, the DCI message is valid until sub-frame (n+4).

The eNodeB 115 performs Clear Channel Assessment (CCA) and/or Extended Clear Channel Assessment (ECCA)

on the unlicensed carrier, and, at some instance, the eNodeB 115 gets channel access (e.g. in the middle of sub-frame n+1).

After (E)CCA success, the eNodeB 115 sends a desired (or, alternatively, pre-defined) broadcast signal on the unlicensed carrier that data transmission will follow, followed by the PDSCH transmission to the UE 105. When the UE 105 detects the broadcast signal, the UE 105 is able to determine the starting position of the subsequent PDSCH transmission, and, thus, the UE 105 starts decoding the data using the previously received DCI.

Although FIG. 5 illustrates the DCI and the data transmission in subsequent sub-frames, the DCI and the data transmission may occur in the same sub-frame. However, in such an instance, the UE 105 may not have adequate time to decode the DCI prior to reception of the data. Therefore, the UE 105 may have to continuously listen for reception on the unlicensed channel, and, thus may not benefit from decreases in power consumption.

If the Clear Channel Assessment (CCA) or Extended Clear Channel Assessment (ECCA) takes additional time for the channel to become clear, the UE 105 can still use the DCI received in sub-frame n for the data decoding in the initial partial sub-frame as long as the (E)CCA succeeds at or before the valid time duration (e.g., sub-frame #(n+4)).

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method of delivering downlink control information associated with downlink data transmission on a first channel, the first channel being an unlicensed channel, the method comprising:
   transmitting, by an ENodeB at a first time, the downlink control information to a user equipment (UE) on a second channel without knowledge at the first time of when the unlicensed channel is available for transmission, the downlink control information being associated with the downlink data transmission occurring at a second time on the unlicensed channel if the unlicensed channel is available, the second time occurring after the first time; and
   transmitting, by the ENodeB, the downlink data transmission to the UE over a partial sub-frame on the unlicensed channel according to the downlink control information without waiting for a start time of a next sub-frame, if the unlicensed channel is available for transmission, wherein a start time of the partial sub-frame does not coincide with the start time of the next sub-frame.

2. The method of claim 1, further comprising:
   transmitting the downlink control information associated with a subsequent sub-frame after the partial sub-frame via a downlink control channel on the unlicensed channel.

3. The method of claim 1, wherein the second channel is a licensed channel.

4. The method of claim 1, wherein the method further comprises:
   performing a channel assessment to determine if the unlicensed channel is available for the downlink data transmission.

5. The method of claim 4, wherein the transmitting downlink control information transmits the downlink control information on the second channel prior to the channel assessment successfully determining that the unlicensed channel is available for the downlink data transmission.

6. The method of claim 4, wherein the transmitting the downlink data transmission transmits the downlink data transmission on the unlicensed channel based on a result of performing the channel assessment.

7. The method of claim 4, further comprising:
   transmitting a signal that enables the UE to detect a start of the downlink data transmission.

8. The method of claim 1, wherein
   the downlink control information is valid for a time duration, and
   the transmitting the downlink data transmission transmits the downlink data transmission in sub-frames on the unlicensed channel occurring within the time duration according to the downlink control information.

9. The method of claim 1, wherein the transmitting downlink control information transmits the downlink control information via a physical downlink control channel (PDCCH) or an enhanced PDCCH (EPDCCH) on the second channel.

10. The method of claim 1, further comprising:
    determining a transport block size of the downlink data transmission based on at least the downlink control information and a length of the downlink data transmission within a sub-frame.

11. A network element comprising:
    a transmitter configured to transmit information via a first channel and a second channel, the first channel being an unlicensed channel; and
    a processor connected to the transmitter, the processor configured to,
      transmit, via the transmitter at a first time, downlink control information to a user equipment (UE) on the second channel without knowledge at the first time of when the unlicensed channel is available for transmission, the downlink control information being associated with downlink data transmission occurring at a second time on the unlicensed channel if the unlicensed channel is available, the second time occurring after the first time, and
      transmit, via the transmitter, the downlink data transmission to the UE over a partial sub-frame on the unlicensed channel according to the downlink control information without waiting for a start time of a next sub-frame, if the unlicensed channel is available for transmission, wherein a start time of the partial sub-frame does not coincide with the start time of the next sub-frame.

12. The network equipment of claim 11, wherein the processor is configured to transmit the downlink control information associated with a subsequent sub-frame after the partial sub-frame via a downlink control channel on the unlicensed channel.

13. The network equipment of claim 11, wherein the second channel is a licensed channel.

14. The network equipment of claim 11, wherein the processor is further configured to perform a channel assessment to determine if the unlicensed channel is available for the downlink data transmission.

15. The network equipment of claim 14, wherein the processor is configured to transmit the downlink control information on the second channel prior to determining, via the channel assessment, that the unlicensed channel is available for the downlink data transmission.

16. The network equipment of claim 14, wherein the processor is configured to transmit the downlink data transmission on the unlicensed channel based on a result of performing the channel assessment.

17. A user equipment (UE) comprising:
  a receiver configured to,
    receive data transmission over a partial sub-frame from a network element via a first channel, the first channel being an unlicensed channel, the partial sub-frame occurring between two sub-frames, wherein a start time of the partial sub-frame does not coincide with a start time of either of the two sub-frames, and
    receive downlink control information via a second channel from the network element prior to the data transmission on the unlicensed channel; and
  a processor configured to decode the data transmission received over the partial sub-frame based on the downlink control information.

18. The UE of claim 17, wherein the receiver is configured to monitor the unlicensed channel continuously, regardless of whether the downlink control information is received on the second channel.

19. The UE of claim 17, wherein the receiver is configured to start to monitor the unlicensed channel only after the downlink control information is received on the second channel.

20. The UE of claim 17, wherein the UE is configured to receive the downlink control information via a physical downlink control channel (PDCCH) or enhanced PDCCH (EPDCCH) on the second channel.

21. The UE of claim 17, wherein the UE is configured to,
  generate decoded information by decoding the downlink control information, and
  store the decoded control information in a memory.

22. The UE of claim 21, wherein the UE is configured to apply the decoded control information only to the data transmission received within a defined time duration after receiving the downlink control information.

23. The UE of claim 17, wherein the UE is configured to detect a start of the data transmission based on a signal transmitted by the network element.

24. The UE of claim 23, wherein the UE is configured to detect the start of the data transmission based on one or more of a signal received before data transmission and a signal embedded in the data transmission in the partial sub-frame.

25. The UE of claim 17, wherein the UE is configured to determine a transport block size based on at least the downlink control information and a length of the data transmission.

26. The UE of claim 25, wherein the UE is configured to determine the transport block size by applying a scaling factor to information in transport block size tables, the scaling factor being dependent on the length of the data transmission.

* * * * *